(12) United States Patent
Aswani et al.

(10) Patent No.: US 7,617,808 B2
(45) Date of Patent: Nov. 17, 2009

(54) ENGINE START DETECTION IN A HYBRID ELECTRIC VEHICLE

(76) Inventors: Deepak Aswani, 7122 Timber Ridge Trail, Westland, MI (US) 48185; Brandon R. Masterson, 6305 N. Territorial, Dexter, MI (US) 48130; Ihab S. Soliman, 4829 Bates Dr., Warren, MI (US) 48092; Andrew J. Silveri, 1136 W. Webster Rd., Royal Oak, MI (US) 48073

( * ) Notice: Subject to any disclaimer, the term of this patent is extended or adjusted under 35 U.S.C. 154(b) by 413 days.

(21) Appl. No.: 11/810,217

(22) Filed: Jun. 5, 2007

(65) Prior Publication Data
US 2008/0302324 A1  Dec. 11, 2008

(51) Int. Cl.
*F02M 17/00* (2006.01)
*B60W 20/00* (2006.01)
*B60K 6/20* (2007.10)

(52) U.S. Cl. .................... 123/179.3; 903/905
(58) Field of Classification Search ............... 123/179.3, 123/179.1, 179.5, 179.28, 179.25; 903/905
See application file for complete search history.

(56) References Cited

U.S. PATENT DOCUMENTS

| | | | | |
|---|---|---|---|---|
| 5,323,743 A * | 6/1994 | Kristiansson | ............ | 123/179.3 |
| 5,691,625 A * | 11/1997 | Kumar et al. | ................. | 322/20 |
| 6,023,137 A * | 2/2000 | Kumar et al. | ............... | 123/481 |
| 6,077,186 A * | 6/2000 | Kojima et al. | ............ | 180/65.25 |
| 6,176,807 B1 * | 1/2001 | Oba et al. | ................... | 903/903 |
| 6,247,437 B1 * | 6/2001 | Yamaguchi et al. | ......... | 903/903 |
| 6,274,943 B1 * | 8/2001 | Hasegawa et al. | ........... | 903/903 |
| 6,336,889 B1 * | 1/2002 | Oba et al. | ................... | 903/910 |
| 6,342,027 B1 * | 1/2002 | Suzuki | ....................... | 903/903 |
| 6,581,705 B2 * | 6/2003 | Phillips et al. | .............. | 903/917 |
| 7,350,602 B2 * | 4/2008 | Colvin et al. | ............... | 903/905 |
| 7,351,182 B2 * | 4/2008 | Kobayashi | ..................... | 477/5 |
| 2001/0022166 A1 * | 9/2001 | Yamaguchi et al. | ...... | 123/179.3 |
| 2004/0134697 A1 * | 7/2004 | Kobayashi et al. | ......... | 180/65.2 |

FOREIGN PATENT DOCUMENTS

| EP | 1782990 A2 | 5/2007 |
|---|---|---|
| GB | 2416407 A | 1/2006 |

* cited by examiner

*Primary Examiner*—Willis R. Wolfe, Jr.
*Assistant Examiner*—Arnold Castro
(74) *Attorney, Agent, or Firm*—David B. Kelley; MacMillan, Sobanski & Todd, LLC

(57) ABSTRACT

A method for detecting sustained combustion in the engine of a hybrid electric powertrain that includes a starter/generator driveably connected to the engine, a transmission for driving a load, and an input clutch for opening and closing a drive connection between the electric machine and the transmission, includes the steps of using the starter/generator to produce torque and crank the engine, preparing the engine to produce combustion, producing torque capacity across the input clutch while slipping the clutch, and continuing use of the starter/generator until a sum of the crankshaft torque applied by the starter/generator and the crankshaft torque applied by the transmission is less than some torque threshold for a predetermined period length.

17 Claims, 3 Drawing Sheets

ENGINE START DETECTION IN A HYBRID ELECTRIC VEHICLE

BACKGROUND OF THE INVENTION

1. Field of the Invention

This invention relates generally to a powertrain for a hybrid electric vehicle and, in particular, to detecting the start of sustained combustion in an internal combustion engine (ICE).

2. Description of the Prior Art

In a vehicle powertrain where a starter/generator has a continuous drive connection to an engine and a selective connection to a transmission through an input clutch whose torque capacity is variable, the vehicle is frequently driven solely by the starter/generator without the engine operating. The engine is frequently stopped to prevent use of engine fuel and is frequently restarted when engine torque is required to augment power produce by the starter/generator.

Detecting that an internal combustion engine has been successfully started is confirmed upon observing stable, sustained combustion in the engine's combustion chamber. A reliable technique for determining that the engine has been started or restarted is required in a powertrain of this type.

It is conventional to start an engine in a vehicle powertrain in which the starter/generator does not have a full time connection to the engine. In such cases, the starter electric motor is connected to the engine by a one-way torque transmitting device, a one-way clutch, such that the starter motor can only add torque to the engine, and the engine is permitted to rotate freely faster than the starter motor speed. In such configurations, engine start detection criteria consists of considering the engine speed relative to the idle reference and/or the starter motor speed over some period of time. An engine speed threshold condition and a duration threshold are used.

A speed based engine start detection scheme is not reliable is a powertrain having of the full-time connection between the engine and the electric machine that starts the engine. Any torque disturbance resulting from an engine start is difficult to observe in the speed domain because the electric machines are continually connected to the engine and the speed reference is regulated by the electric machine. Engine speed cannot exceed the starter/generator speed.

Furthermore, aggressively close engine start and transmission events can distort engine start detection mechanism when there is overlap of transmission events during the engine start process when using conventional start detection techniques.

SUMMARY OF THE INVENTION

A method for detecting sustained combustion in the engine of a hybrid electric powertrain that includes a starter/generator driveably connected to the engine, a transmission for driving a load, and an input clutch for opening and closing a drive connection between the electric machine and the transmission, includes the steps of using the starter/generator to produce torque and crank the engine, preparing the engine to produce combustion, producing torque capacity across the input clutch while slipping the clutch, and continuing use of the starter/generator until a sum of the torque applied to the crankshaft by the starter/generator and the torque applied to the crankshaft by the transmission is less than some torque threshold during start for a predetermined period length.

The method uses the estimated transmission load on the crankshaft and accounts for this in the detection process because the starter/generator torque estimate alone does not indicate that the engine has been started.

The method provides robust engine start detection for hybrid electric vehicle configurations when there may be some overlap of mechanical transmission events during the engine start process. Furthermore, since the estimation of transmission load on the crankshaft can be accurately determined only while slipping the input clutch, engine start detection is a necessary condition before operating the transmission with full engagement of the input clutch.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
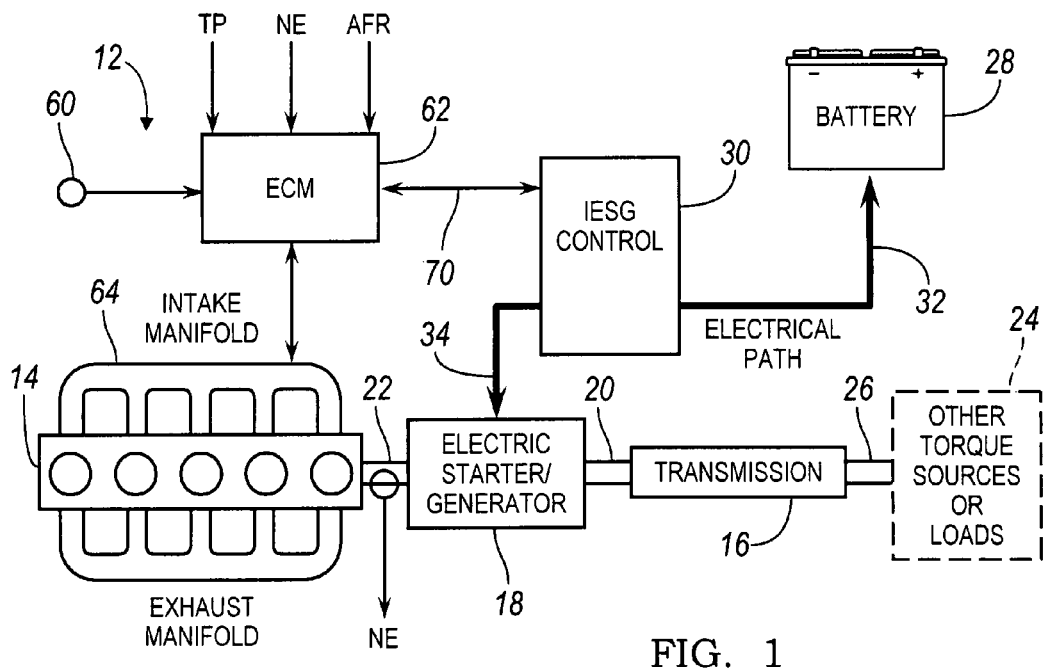
FIG. 1 is a schematic diagram showing a powertrain for a hybrid electric vehicle.
Figure 2:
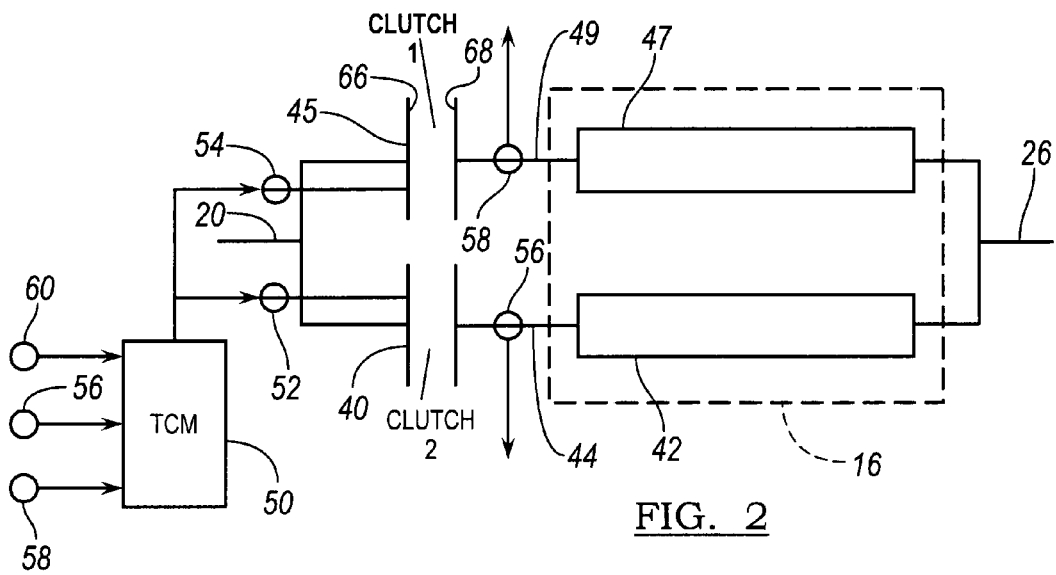
FIG. 2 is a schematic diagram showing details of the transmission shown in FIG. 1.

As shown in FIGS. 1 and 2, a HEV powertrain 12 includes a power source, such as a diesel or gasoline engine 14; a transmission 16, such as dual input clutch powershift transmission or a manual transmission; a second power source 18, such as a crank integrated starter/generator (CISG) or a belt integrated starter/generator (BISG), driveably connected to the engine crankshaft 22 and connected to the transmission input 20. The powertrain 12 may include another power source or load 24, such as an electric motor or electric rear axle drive (ERAD) driveably connected to the transmission output 26. Electric machine 18 provides starter/generator capability. An electric storage battery.28, which is electrically connected to electric machine 18, supplies power to crank the engine 14 when the engine is being started with the electric machine 18 in starter mode.

When electric machine 18 operates in generator mode, the state of charge of battery 28 can be replenished when machine 18 is driven by the engine or by the wheels of the vehicle through the transmission 16. An IESG controller 30 controls the magnitude of electric power carried on lines 32, 34 between electric machine 18 and battery 28.

FIG. 2 illustrates a first input clutch 40, which selective connects the input of transmission 16 alternately to the even-numbered gears 42 associated with a first shaft 44; and a second input clutch 46, which selective connects the transmission input 20 alternately to the odd-numbered gears 47 associated with a second shaft 49.

An electronic transmission control module (TCM) 50 includes a microprocessor accessible to electronic memory and containing control algorithms expressed in computer readable code, which are executed repeatedly at frequent intervals. TCM 50 controls engagement, disengagement and slip across the input clutches 40, 45 by issuing command signals sent to solenoid-actuated servos 52, 54, which operate the input clutches. A speed sensor 56 produces an electronic signal representing the speed of a shaft 44, which signal is transmitted to as input to TCM 50. A speed sensor 58 produces an electronic signal representing the speed of a shaft 49, which signal is transmitted as input to TCM 50. Engine speed NE is also supplied as input to TCM 50 by a speed sensor 60 on the engine crankshaft 22. The torque capacity of each input clutch 40, 45 is determined by TCM 50. Slip across the respective input clutch is determined by TCM 50 from the speed of crankshaft 22 and the speed of the respective transmission shaft 44, 49.

An electronic engine control module (ECM) 62, which communicates with the TCM 50, also includes a microprocessor accessible to electronic memory and containing control algorithms expressed in computer code, which are executed repeatedly at frequent intervals. ECM 62 controls operation of engine 14 in response to input signals produced by various sensors representing engine and driveline parameters, such as engine speed NE, engine throttle position TP, air mass flow rate MFR in the engine intake manifold 64, etc. ECM 62 controls engine operation by issuing control commands, which vary the engine ignition spark timing, air-fuel ratio and other engine control parameters.

In a powertrain whose engine 14 has a continuous connection with an electric machine 18, such as a CISG or BISG, detecting the start of sustained combustion in the internal combustion engine 14 should be performed in the torque domain because changing the torque capacity of the input clutch 40, 45 can impose a friction and/or inertia torque disturbance on the crankshaft 22, particular when such transmission events occur close to the point in time when the engine starts. As a result of the friction and/or inertia torque, the starter/generator torque does not provide a reliable indication of sustained engine combustion. For example, when the engine starts with a quick transmission engagement, the transmission input clutch can stroke or partially engage at a load that is similar to that of motoring the engine (i.e., without fuel) pumping and friction losses. When operating in this condition, it is impossible to determine that the engine has started by monitoring starter/generator torque alone, because starter/generator torque is constant before, during and after sustained engine combustion occurs.

Figure 3:
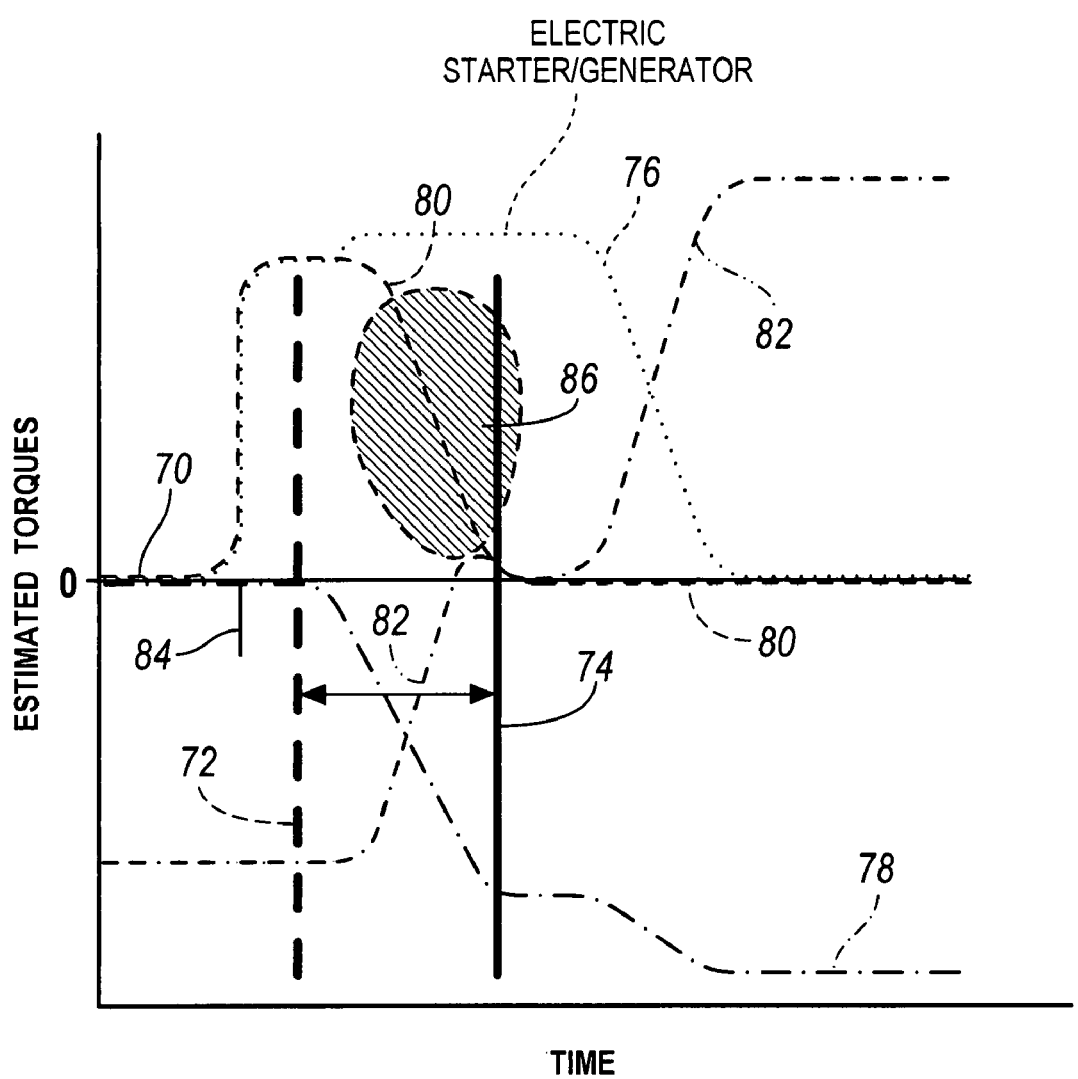
FIG. 3 is a graph showing the variation of the sum of torque produced by the CISG and torque capacity of the input clutch while starting the engine shown in FIG. 1.

In the engine starting routine represented in FIG. 3, the proper indication that the engine has started is instead the algebraic sum of the torque applied by the starter/generator 18 and the torque applied by the transmission 16 on the crankshaft 22. If the transmission is fully engaged, the torsional load due to other torque sources and loads 24 is transmitted also by transmission 16 to the crankshaft 22 through the electric machine 18. Since road load is difficult to estimate accurately, start detection with the transmission fully engaged is not a reliable method. Hence, start detection is a necessary criterion to enable transmission engagement.

The magnitude of torque produced by the starter/generator 18 is determined by the ECM 62 either from commands for IESG torque 70 issued by the ECM to an IESG controller 30, or from the magnitude of electrical power carried on lines 32, 34 between starter/generator 18 and battery 28. The magnitude of electric power can be determined accurately from the current supplied to starter/generator 18, the voltage across the machine, and its power loss.

While the oncoming input clutch 40, 45 is slipping, the torque load imposed by transmission 16 on crankshaft 22 is represented by the input clutch torque capacity. TCM 50 determines the torque capacity of the oncoming input clutch from parameters including slip across the clutch; temperature of the clutch; pressure applied to the friction surfaces 66, 68 of the clutch by the actuating servo 56, 58; effective radius of the mating friction surfaces of the clutch from the axis of rotation 20; coefficient of friction of the mating friction surfaces; gain of the clutch. The magnitudes of these data are either stored in electronic memory or determined from input data from the sensors. After the oncoming input clutch is fully engaged, it is impossible to accurately estimate the torque load on crankshaft 22 imposed by transmission 14. Therefore, full engagement of the input clutches 40, 45 occurs only after the engine has started.

In FIG. 3, both input clutches 40, 45 are open at 70. Vertical line 72 represents the point in time where torque capacity of the oncoming input clutch begins. Vertical line 74 represents the point in time where the oncoming input clutch is fully engaged. Line 76 represents the variation of CISG torque during the engine starting procedure. Line 78 represents the variation of torque load transmitted to crankshaft 22 determined or estimated with reference to the torque capacity of the oncoming input clutch. Line 80 represents the algebraic sum of the torque applied to crankshaft 22 from starter/generator 18 and the torque applied to crankshaft 22 from transmission 16. Line 82 represents the variation of engine torque during the engine starting procedure. Vertical line 84 represents the point in time when torque output by starter/generator 18 begins.

During the period before the oncoming input clutch is activated and after torque is produced by starter/generator 18, engine torque 82 is negative representing an inertia and friction/pumping load on starter/generator 18. Thereafter, engine torque increases as the engine begins to produce torque, and it rises rapidly after the engine starts in zone 86.

Transmission crankshaft torque 78 is zero until the subject input clutch is activated at 72; thereafter, it becomes a large negative torque load on the starter/generator 18. As algebraic sum 80 of the torque applied to crankshaft 22 from starter/generator 76 and the torque 78 transmitted to crankshaft 22 from transmission 18 declines in zone 86, and sustained combustion of engine 14 occurs, as evidenced by the increase in engine torque 82 that occurs after zone 86.

Figure 4:
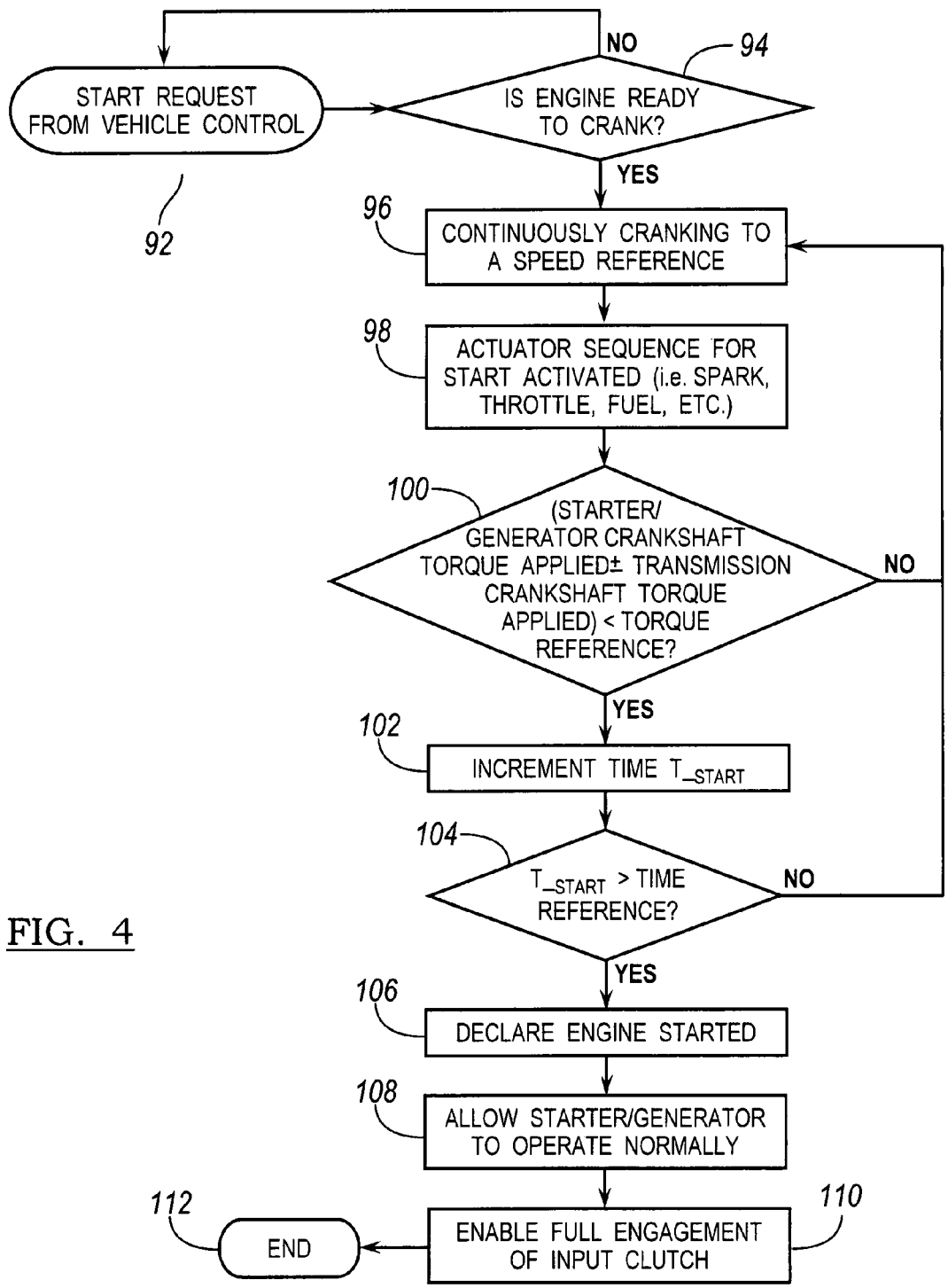
FIG. 4 is a diagram of the steps for detecting the start of sustained combustion in the engine.

In FIG. 4, a request 92 to begin the engine start procedure is produced by a vehicle controller and is sent to the ECM 62.

At 94, a test is made by controller ECM 62 to determine whether engine 14 is ready to crank. If the result of test 94 is logically false, control returns to 92. But if the result of test 94 is true, control advances to 96 where engine 14 is cranked by starter/generator 18 to a reference engine speed.

At 98, the ECM 62 actuates ignition spark, throttle, fuel and another engine parameters to start the engine.

At 100, a test is made to determine whether the algebraic sum of the crankshaft torque applied by the starter/generator and the torque applied to crankshaft 22 from transmission 16 is less than some torque threshold, which is a calibrated constant value stored in electronic memory. If the result of test 100 is logically false, control returns to 96. But if the result of test 100 is true, control passes to 96 where a counter is started and periodically incremented to measure time following the start of the counter.

At 104, a test is made to determine whether the count 102 has reached a reference count. If the result of test 94 is logically false, control returns to 96. But if the result of test 104 is true, at 106 the engine is determined to have been started.

At 108, starter/generator 18 operates normally without the engine starting procedure control. At 110, TCM 50 enables input clutches 40, 45 to operate in accordance with a transmission control algorithm and to become fully engaged. At 112, the engine starting procedure is terminated.

In accordance with the provisions of the patent statutes, the preferred embodiment has been described. However, it should be noted that the alternate embodiments can be practiced otherwise than as specifically illustrated and described.

What is claimed is:

1. A method for detecting sustained combustion in the engine of a hybrid electric powertrain that includes an electric machine driveably connected to the engine, a transmission for driving a load, and an input clutch for opening and closing a drive connection between the electric machine and the transmission, the method comprising the steps of:
- (a) using the electric machine to crank the engine;
- (b) activating an engine operating parameter that will start the engine;
- (c) producing slip across the input clutch;
- (d) determining that a sum of torque applied to a crankshaft of the engine by the machine and torque applied to said crankshaft by the transmission is less than a reference torque magnitude; and
- (e) discontinuing use of the electric machine to crank the engine.

2. The method of claim 1, further comprising the step of allowing the input clutch to become fully engaged.

3. The method of claim 1, wherein step (a) further comprises the step of using the electric machine to crank the engine at a reference engine speed.

4. The method of claim 1, wherein step (b) further comprises the step of at least one of supplying fuel to the engine, supplying air to the engine; producing an ignition spark in a combustion chamber of the engine.

5. The method of claim 1, wherein step (d) further comprises the steps of:
- determining the crankshaft torque produced by the machine;
- determining the crankshaft torque applied by the transmission; and
- adding the crankshaft torque produced by the machine to the crankshaft torque applied by the transmission.

6. The method of claim 5, wherein the step of determining the magnitude of torque produced by the machine further comprises the steps of:
- determining a magnitude of electric power supplied to the electric machine;
- determining a magnitude of electric power loss by the electric machine; and
- using a difference between said supplied power and said lost power to determine the magnitude of torque produced by the machine.

7. The method of claim 5, wherein the step of determining the crankshaft torque applied by the transmission comprises the steps of:
- using at least one of slip across the clutch, temperature of the input clutch, pressure applied to friction surfaces of the clutch, effective radius of the mating friction surfaces of the clutch from an axis of rotation, coefficient of friction of the friction surfaces, and gain of the clutch.

8. The method of claim 1, wherein step (d) further comprises the steps of:
- determining the crankshaft torque applied by the machine;
- determining the crankshaft torque applied by the transmission; and
- adding the crankshaft torque applied by the machine to the crankshaft torque applied by the transmission;
- determining a magnitude of the reference torque;
- determining a length of a reference period; and
- determining a length of a period during which the said magnitude of torque is less than said reference torque.

9. A method for detecting sustained combustion in the engine of a hybrid electric powertrain that includes a starter/generator driveably connected to the engine, a transmission for driving a load, and an input clutch for opening and closing a drive connection between the electric machine and the transmission, the method comprising the steps of:
- (a) using the starter/generator to produce torque and crank the engine;
- (b) preparing the engine to produce combustion;
- (c) producing torque capacity across the input clutch while slipping the clutch;
- (d) continuing said use of the starter/generator until a sum of the crankshaft torque applied by the starter/generator and the crankshaft torque applied by the transmission is less than a reference torque for a predetermined period length.

10. The method of claim 9, further comprising the step of discontinuing use of the starter/generator to crank the engine.

11. The method of claim 9, further comprising the step of allowing the input clutch to become fully engaged.

12. The method of claim 9, wherein step (a) further comprises the step of using the starter/generator to crank the engine at a reference engine speed.

13. The method of claim 9, wherein step (b) further comprises the step of using at least one of supplying fuel to the engine, supplying air to the engine; producing an ignition spark in a combustion chamber of the engine.

14. The method of claim 1, wherein step (d) further comprises the steps of:
- determining a magnitude of crankshaft torque applied by the starter/generator;
- determining a magnitude of crankshaft torque applied by the transmission; and
- adding the crankshaft torque applied by the starter/generator to the crankshaft torque applied by the transmission.

15. The method of claim 14, wherein the step of determining the magnitude of torque produced by the starter/generator further comprises the steps of:
- determining a magnitude of electric power supplied to the starter/generator;
- determining a magnitude of electric power loss by the starter/generator; and
- using a difference between said supplied power and said lost power to determine the magnitude of torque produced by the starter/generator.

16. The method of claim 14, wherein the step of determining the crankshaft torque applied by the transmission comprises the steps of:
- using at least one of slip across the clutch, temperature of the input clutch, pressure applied to friction surfaces of the clutch, radius of the mating friction surfaces of the clutch from an axis of rotation, coefficient of friction of the friction surfaces, and gain of the clutch.

17. The method of claim 14, wherein step (d) further comprises the steps of:
- determining the crankshaft torque applied by the starter/generator;
- determining the crankshaft torque applied by the transmission;
- summing the crankshaft torque applied by the starter/generator and the crankshaft torque applied by the transmission
- determining a magnitude of the reference torque;
- determining a length of a reference period; and
- determining a length of a period during which the summed magnitude of torque is greater than the reference torque.

* * * * *